(12) United States Patent
Siegel

(10) Patent No.: US 11,816,133 B2
(45) Date of Patent: Nov. 14, 2023

(54) CROWDSOURCED PROBLEM-SOLUTION DIRECTORY

(71) Applicant: Oliver Siegel, Laguna Beach, CA (US)

(72) Inventor: Oliver Siegel, Laguna Beach, CA (US)

( * ) Notice: Subject to any disclaimer, the term of this patent is extended or adjusted under 35 U.S.C. 154(b) by 0 days.

(21) Appl. No.: 17/709,238

(22) Filed: Mar. 30, 2022

(65) Prior Publication Data

US 2023/0315762 A1 Oct. 5, 2023

(51) Int. Cl.
*G06F 7/00* (2006.01)
*G06F 16/28* (2019.01)

(52) U.S. Cl.
CPC ............................... *G06F 16/285* (2019.01)

(58) Field of Classification Search
USPC .................................................. 707/600–899
See application file for complete search history.

(56) References Cited

U.S. PATENT DOCUMENTS

| | | | |
|---|---|---|---|
| 9,373,086 B1 | 6/2016 | Corville et al. | |
| 10,430,425 B2 | 10/2019 | Narayanan et al. | |
| 2015/0220836 A1* | 8/2015 | Wilson | H04L 67/52 706/46 |
| 2017/0011308 A1 | 1/2017 | Sun et al. | |
| 2019/0296969 A1* | 9/2019 | Zimny | H04W 12/03 |
| 2019/0361871 A1* | 11/2019 | Brunets | G06F 16/212 |
| 2019/0364154 A1* | 11/2019 | Hermanek | G06F 16/221 |
| 2020/0285944 A1* | 9/2020 | Lee | G06F 16/9024 |

FOREIGN PATENT DOCUMENTS

CA 2859930 A1 3/2016

OTHER PUBLICATIONS

Bhagat et al., Node Classification in Social Networks. In: Aggarwal, C. (eds) Social Network Data Analytics, (2011), pp. 1-37, Springer, Boston, MA. https://doi.org/10.1007/978-1-4419-8462-3_5.
Erik Hans Rasmussen, Essential Tools for Crowdsourcing Answers to Your Questions, May 8, 2012, pp. 1-22, www.instantshift.com/2012/05/08/essential-tools-for-crowdsourcing-answers-to-your-questions/.

* cited by examiner

*Primary Examiner* — Isaac M Woo
(74) *Attorney, Agent, or Firm* — Thomas E. LaGrandeur

(57) ABSTRACT

The present disclosure is directed to a crowdsourced problem-solution directory and a computer implemented, node-based system to inventory problems, needs, and solutions. Within this framework, individuals & teams can use their cognition and reasoning to identify and describe problems, goals, and solutions as well as their respective causal connections, and then use a computer interface to add this information to a shared database. This crowdsourced database will then represent a universal problem-solution object. This tree-like, multidimensional node network serves the purpose to inventory every problem, every goal, and every solution, as well as their casualties, represented as nodal connections.

13 Claims, 22 Drawing Sheets

Fig 1. Classified Nodes & Categorized Connections labeled nodes with labeled connections connected to other labeled nodes

Fig 2.

n-Dimensional Node Network with n*n Connection Categories

| | NODE TYPE A | NODE TYPE B | NODE TYPE C | ... | NODE TYPE N |
|---|---|---|---|---|---|
| NODE TYPE A | Connection type AA | Connection type BA | Connection type CA | | |
| NODE TYPE B | Connection type AB | Connection type BB | Connection type CB | | |
| NODE TYPE C | Connection type AC | Connection type BC | Connection type CC | | |
| ... | | | | ... | |
| NODE TYPE N | | | | | Connection type NN |

Fig 3.

Technical Terms for Node Classification & Connection Categorization

| DIRECTIONAL NODE | POSITIVE NODE | NEGATIVE NODE |
|---|---|---|
| | POSITIVE CONNECTION | NEGATIVE CONNECTION |

Fig 4. Node Classification with Specific Terms

| | specific terms used | icons |
|---|---|---|
| DIRECTIONAL NODES | descriptions of terminal goals (needs & values) | |
| POSITIVE NODES | descriptions of instrumental goals (solutions) | |
| NEGATIVE NODES | descriptions of violations to terminal goals (problems) | |

Fig 5.

Node Connections Categorized as Child / Parent Connections

| | NEGATIVE NODE | POSITIVE NODE |
|---|---|---|
| NEGATIVE CHILD NODE | negative child of negative node | negative child of positive node |
| POSITIVE CHILD NODE | positive child of negative node | positive child of positive node |
| NEGATIVE PARENT NODE | negative parent of negative node | negative parent of positive node |
| POSITIVE PARENT NODE | positive parent of negative node | positive parent of positive node |

Fig 6.

Connection Categorization with Specific Terms

| | NEGATIVE NODE | POSITIVE NODE |
|---|---|---|
| DIRECTIONAL NODE | violated terminal goal | fulfilled terminal goal |
| NEGATIVE CHILD NODE | sub-problems, issues, negative consequences, repercussions, obstacles, symptoms, risks | |
| POSITIVE CHILD NODE | solutions, systems, methods, action steps | - |
| NEGATIVE PARENT NODE | historic originating root causes; super-problems | solved problems |
| POSITIVE PARENT NODE | | - |

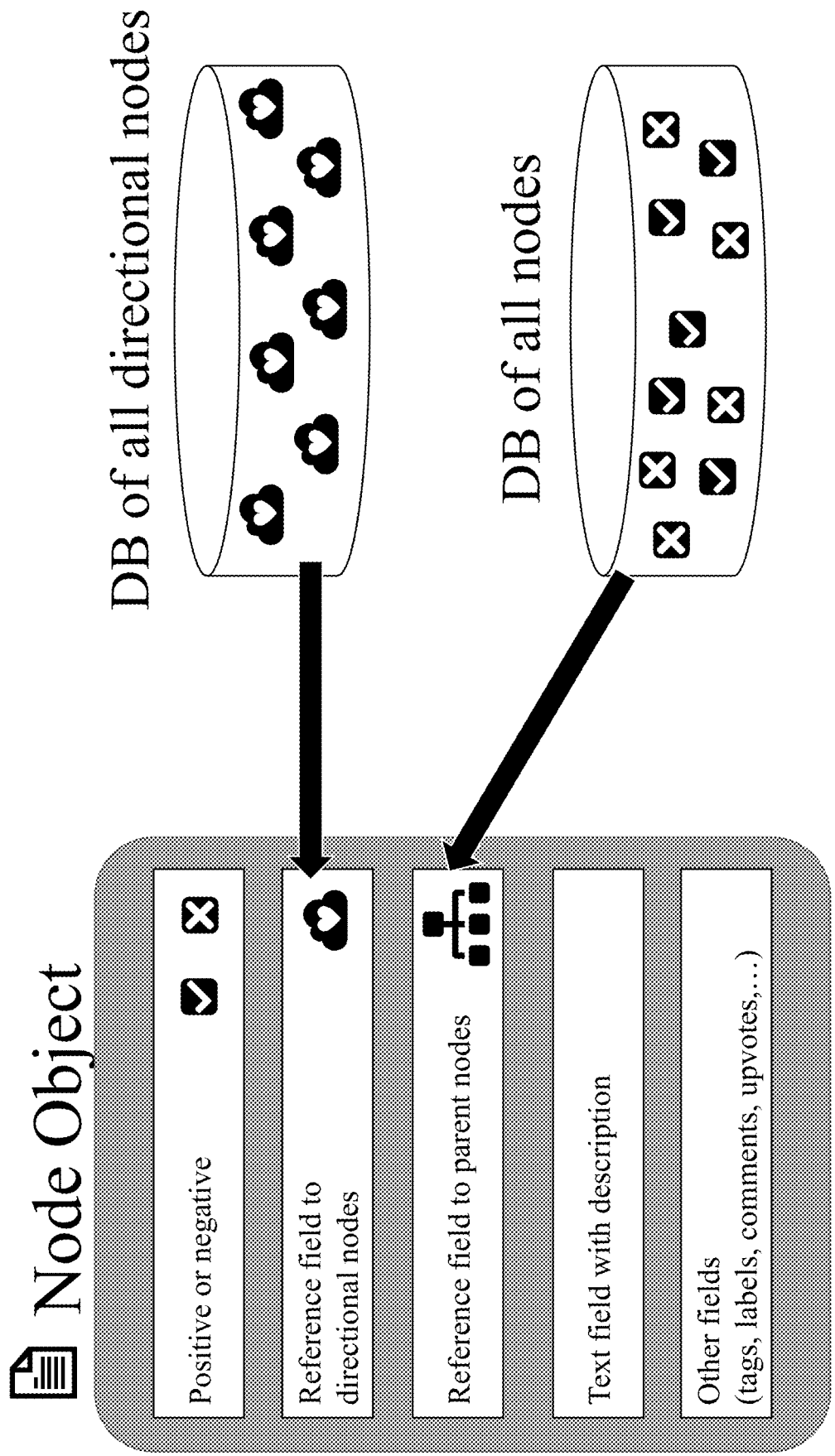

Fig 9. connected computer devices

Fig 10. List Views of Node Documents

Fig 13. Problem Document

Fig 15. Solution Document

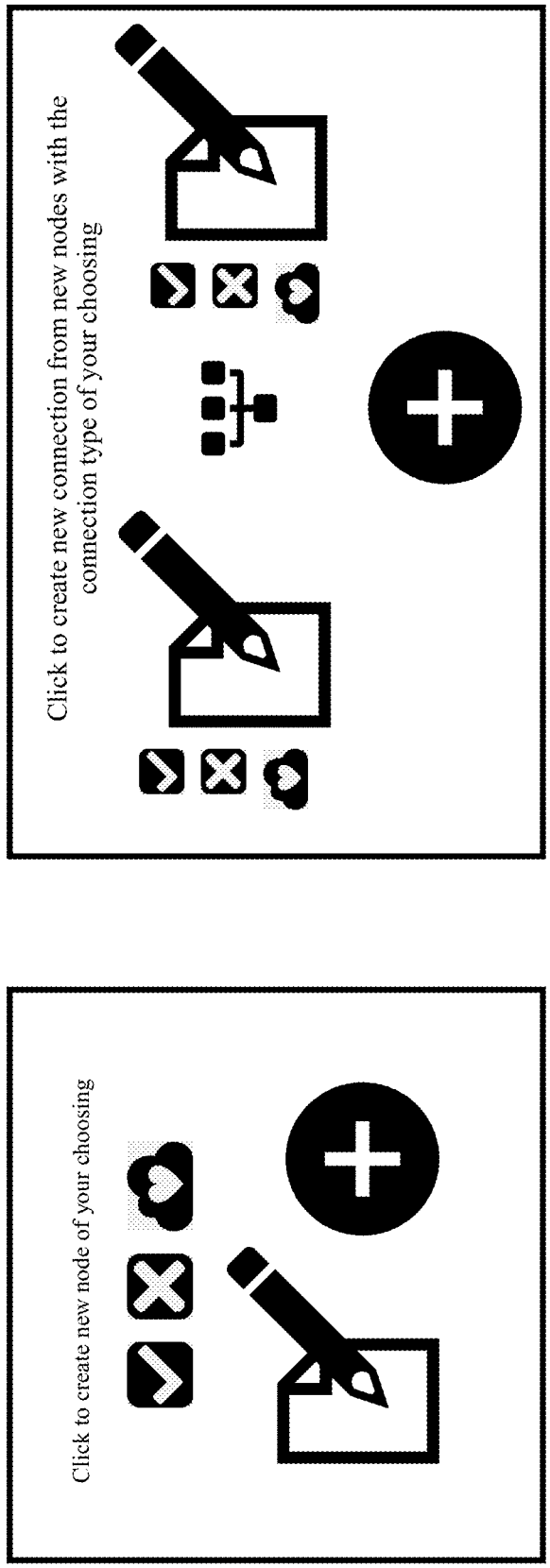
Fig 17. Creating New Nodes & New Connections

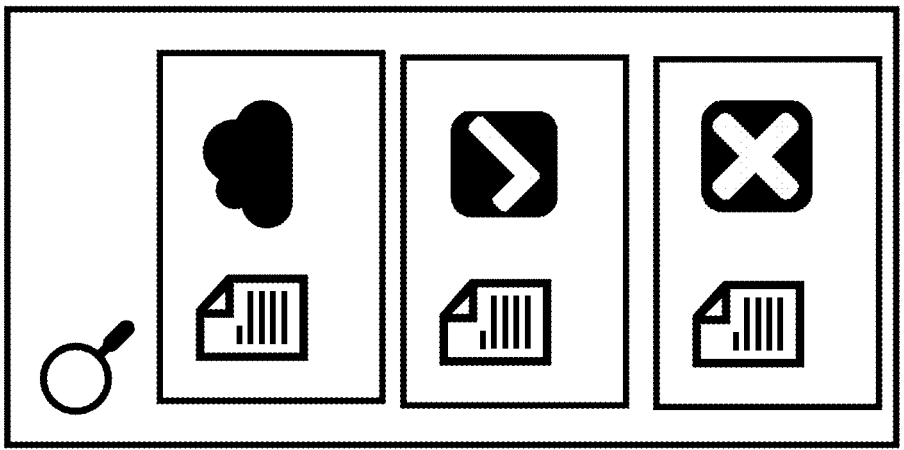
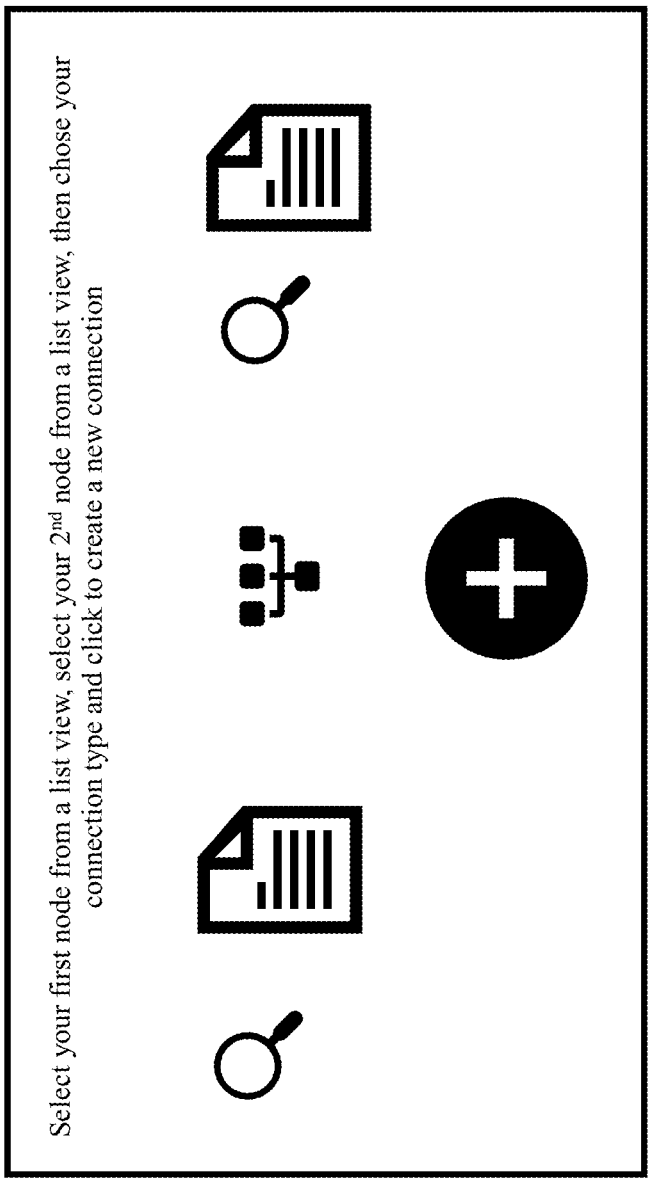
Fig 18. Creating New Connections from Existing Nodes

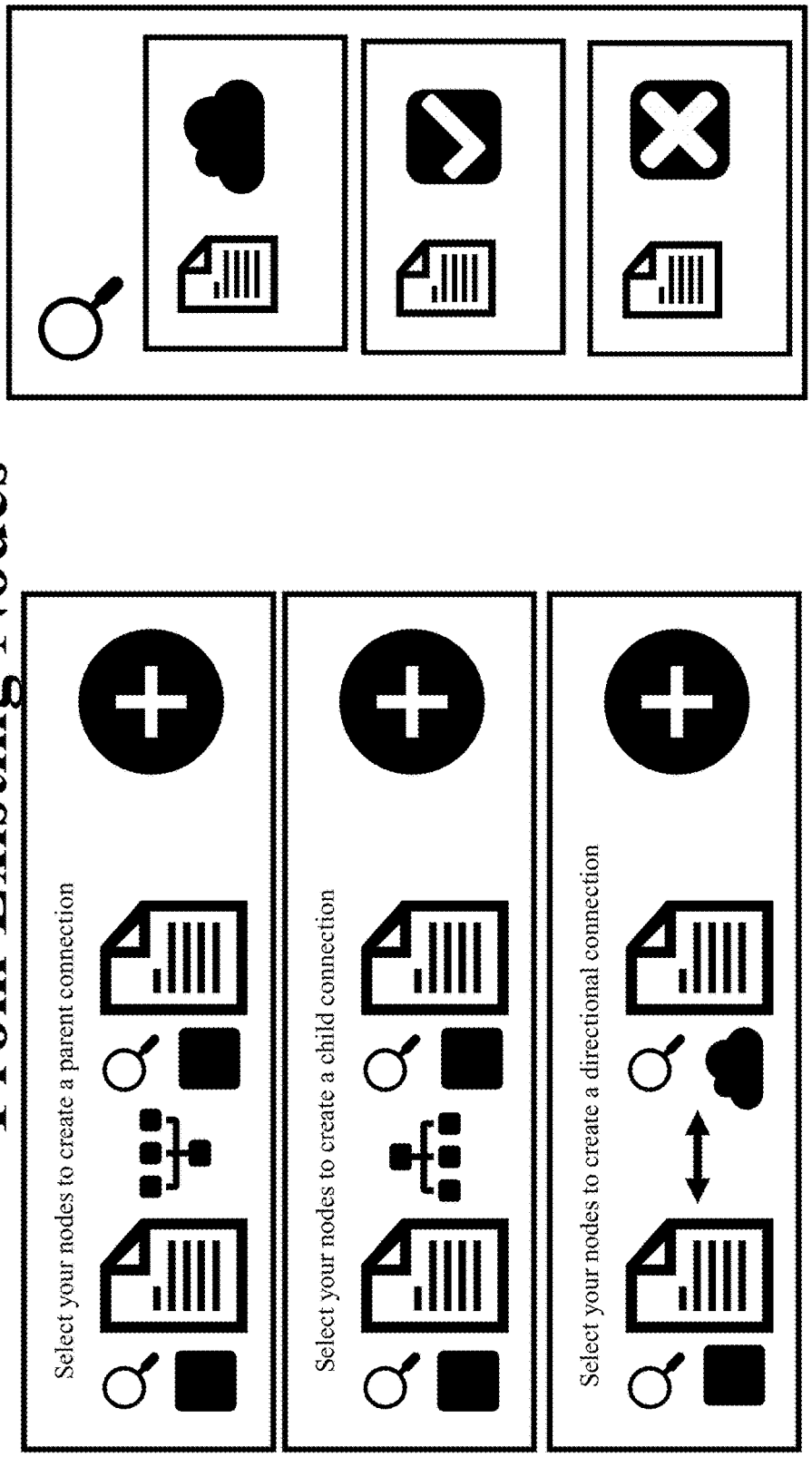

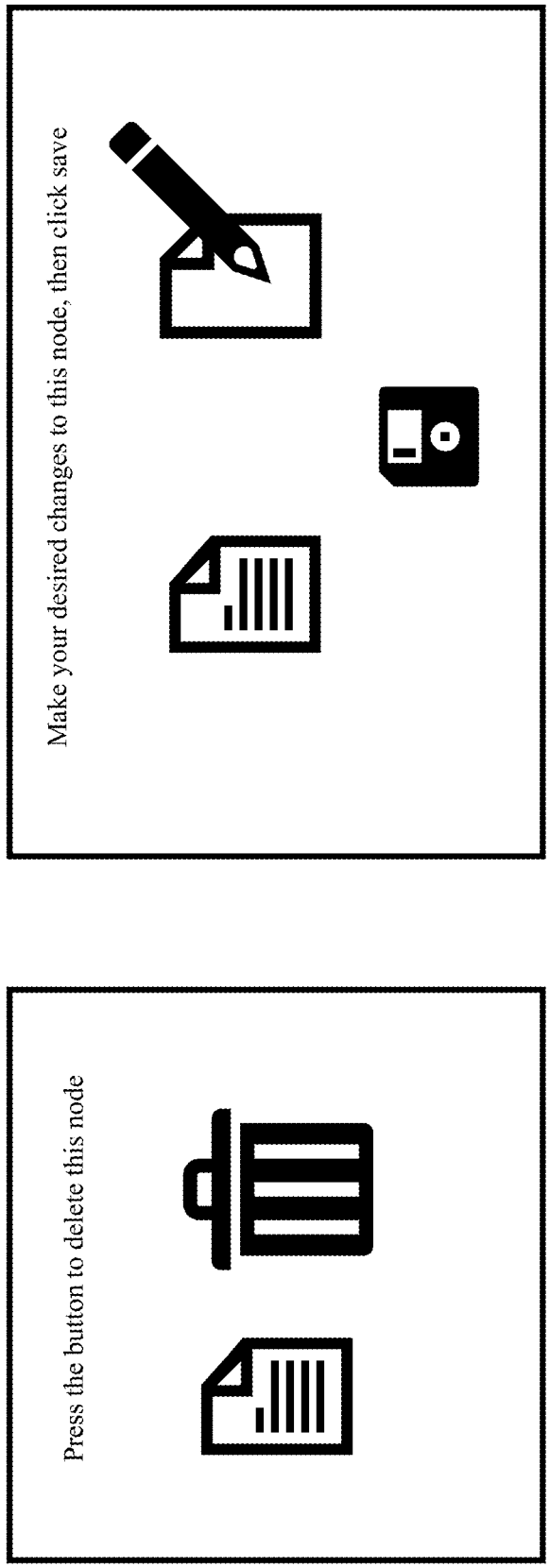
Fig 20. Editing or Deleting Nodes

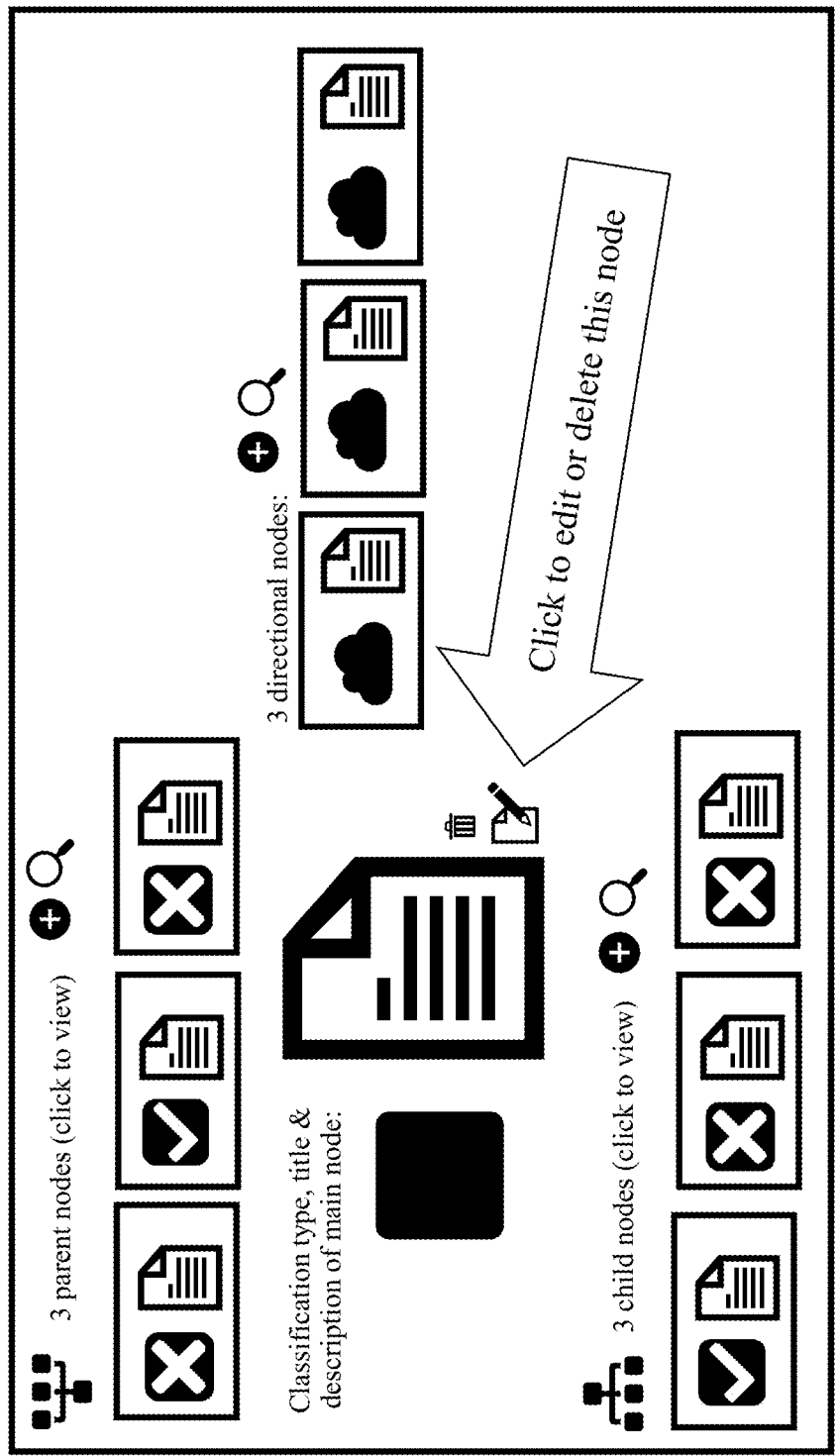

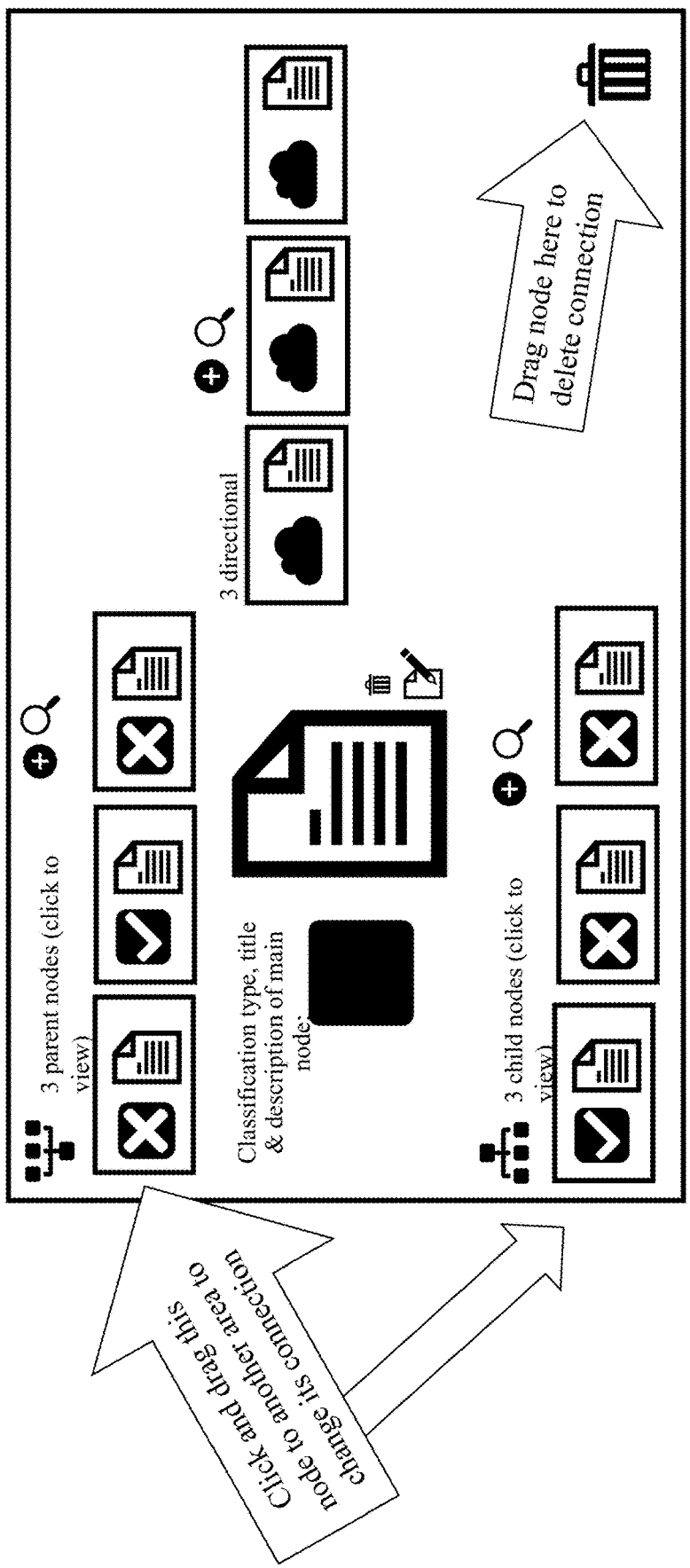

CROWDSOURCED PROBLEM-SOLUTION DIRECTORY

CROSS-REFERENCE TO RELATED APPLICATIONS

This application claims priority to U.S. Provisional Application No. 63/167,957, filed Mar. 30, 2021, which is incorporated by reference in its entirety.

FIELD OF THE DISCLOSURE

This disclosure relates generally to a crowdsourced problem-solution directory and a computer implemented, node-based system to inventory problems, needs, and solutions.

BACKGROUND

There are a number of traditional forms of organizing information in a manner that allows people to look up and analyze information with end goals of identifying problems and solutions. Examples of such forms of information include encyclopedias, dictionaries, thesauruses, reference books, manuals, journals for various fields of study, and other forms of information organization exist for allowing people to look up and analyze information. These forms of information organization are generally organized by alphabetical order based on titles or themes. With modern computing, new forms of information organization and presentation have been developed, such as search engines that are implemented through the internet or world wide web. These forms of information organization generally rely on the user of the product to know generally what information they are seeking. For example, for a thesaurus a synonym or antonym must be known, for a dictionary a word to be defined must be known, for a reference book a subject must be known, for a search engine a subject for query must be known, and so on.

In the current state of the art of problem solving, resources available to users are typically facilitated through computer devices that are connected as networked computers and data bases. The networked computers and data bases provide for information sharing in the forms of online message boards, question and answer forums, social networks, information websites, and so on. The information sharing occurs through unstructured or poorly structured node networks, such as the world wide web. In a node network, a node is connected to one or more other nodes. While the world wide web provides an information network of websites connected to other websites (or nodes connected to other nodes), it generally lacks an organizational structure, such that virtually any website can be connected to any other website, and the information put on a website can be arbitrarily placed by users. As such, the current state of the art provides a wealth of information in a relatively unstructured information network that limits and guides user choices.

While there are certain structures and patterns that have crystallized in the world wide web, there still exists a fundamental problem in that while information is contained in websites, the information content does not facilitate understanding around undiscovered problems and issues. More specifically, problems with current, state of the art node networks include the structure of the node networks (or lack thereof); that information effectively exists in information silos or echo chambers that don't communicate well across different domains; and the available information promotes an unawareness of what is lacking; that is, not knowing what information is not known. In this respect, information is created and uncovered by using available information.

Accordingly, there exists a need in the art for an approach that allows for effective problem stating/identification and providing solutions to problems. The present invention addresses this need by providing crowdsourced problem-solution directories that provide two general functions: 1) a search function that assists users towards quickly finding solutions to problems; and 2) a problem-solving function, in which the directories facilitate communication and understanding around undiscovered and unsolved issues to simplify problem and goal identification, and to create effective solutions. The crowd-soured directories are technically implemented by use of a computer implemented node-based system to inventory problems, needs, and solutions.

SUMMARY

The disclosure presented herein relates to a crowdsourced problem-solution directory and a computer implemented, node-based system to inventory problems, needs, and solutions.

A node-based system as described herein includes a multi-dimensional node network that comprises three or more different types of nodes that are interconnected, wherein each type of node is interconnected to one or more types of nodes, such that a given type of node can be connected to a similar type of node and/or a different type of node, and wherein nodes are connected by connection types that are categorized as either a connection between similar types of nodes or a connection between different types of nodes.

In one embodiment, a multi-dimensional node network comprises three types of nodes: a directional node, a positive node, and a negative node, wherein a directional node is connected to a positive node by a positive connection type, and a directional node is connected to a negative node by a negative connection type. Such a multi-dimensional node network can be further characterized as having one or more directional nodes that comprise descriptions of terminal goals; one or more positive nodes that comprise descriptions of instrumental goals; and one or more negative nodes that comprise descriptions of violations to terminal goals (also referred to as violated terminal goals).

A multi-dimensional node network as described herein can be categorized as having parent and child node connections, wherein; 1) a positive parent node can be connected to a negative node as a positive parent of a negative node; 2) a positive parent node can be connected to a positive node as a positive parent of a positive node; 3) a negative parent node can be connected to a negative node as a negative parent of a negative node; 4) a negative parent node can be connected to a positive node as a negative parent of a positive node; 5) a positive child node can be connected to a negative node as a positive child of a negative node; 6) a positive child node can be connected to a positive node as a positive child of a positive node; 7) a negative child node can be connected to a negative node as a negative child of a negative node; and 8) a negative child node can be connected to a positive node as a negative child of a positive node.

A multi-dimensional node network as described herein can also be categorized as having nodes and node connections such that: 1) a directional node connected to a negative node is termed a violated terminal goal; 2) a directional node connected to a positive node is termed a fulfilled terminal goal; 3) a positive parent node that is connected to a negative node can be termed as connected via historic originating root causes and super-problems; 4) a negative parent node that is connected to a negative node can be termed as connected via historic originating root causes and super-problems; 5) a negative parent node that is connected to a positive node can be termed as connected via solved problems; 6) a positive child node that is connected to a negative node can be termed as connected through solutions, systems, methods, and action steps; 7) a negative child node that is connected to a negative node can be termed as connected through sub-problems, issues, negative consequences, repercussions, obstacles, symptoms, and risks; and 8) a negative child node that is connected to a positive node can be termed as connected through sub-problems, issues, negative consequences, repercussions, obstacles, symptoms, and risks.

A node network as described herein can be implemented through a computer database comprising a node object for each node, wherein the node object comprises: 1) a positive or negative type of node; 2) a reference field to directional nodes that are stored in a connected database of directional nodes; 3) a reference field to parent node objects that are stored in a connected database of all node objects; 4) a text field that provides a description of the node; and 5) other fields for labeling, categorizing, describing, or interacting with the node object.

A node network can further be described herein as implemented through a computer database comprising a node object wherein the node object comprises: 1) a positive or negative type of node; 2) a reference field to one or more directional node connection objects that are stored in a connected database of directional nodes, wherein a connectional object contains fields to indicate which directional node is connected to which other node, with what type of node connection, which user created the node connection, and other fields; 3) a reference field to one or more connection objects that are stored in a connected database of all node objects, wherein a connection object contains fields to indicate which node is connected to which other node in a parent/child connection, which user created the connection, and other fields; 4) a reference field to one or more description objects, wherein a description object contains information about which user created which description for which node and other fields; 5) a reference field to one or more user profile objects, wherein a user profile object contains information about the user of the network, and other fields; 6) a reference field to one or more container objects, wherein a container object contains information about how to categorize nodes based on their topic, information about which user created the container, a name of the topic, a description of the container, and other fields about the container object; and 7) other fields for labeling, categorizing, describing, or interacting with the node object.

A node network as described herein can be implemented on connected devices comprising: a first device having: at least one memory including processor readable instructions; and at least one processor arranged to read the processor readable instructions stored on the at least one memory and execute the processor readable instructions to: 1) receive a first request for first nodal information; 2) send the first nodal information in response to the first request for the first nodal information; 3) receive a second request for second nodal information; and 4) send the second nodal information in response to the second request for the second nodal information, wherein the first nodal information includes a first node and first nodal connections, and the second nodal information includes a second node and second nodal connections. As such, the device can be configured to display node objects and connections between node objects for a user to view, read, and browse using an input device.

Furthermore, a device as presently described can be configured to display a node of one type and nodes connected to it as a list view or similar display that displays the different classifications of nodes and categories of connections; and the ability to select one particular node and receive detailed information about the node in the form of a node document.

A node network as presently described can be configured to show: 1) a nested node document that displays a node object; 2) an indicator of the classification of a viewed node; 3) a number and descriptions of the viewed node's directional nodes; 4) a number and descriptions of the viewed node's parent nodes and an indicator of a classification of these parent nodes; and 5) a number and descriptions of the viewed node's child nodes and an indicator of a classification of these child nodes.

In another embodiment, a node network as described herein is configured to show: 1) a problem document that displays a negative node object; 2) a number and descriptions of the negative node object's historic, originating root causes and an indicator of the classification of these nodes; 3) a number and descriptions of the negative node object's symptoms, issues, sub-problems, negative consequences, obstacles, risks and repercussions; 4) a number and descriptions of the negative node object's violated terminal goals; and 5) a number and descriptions of the negative node object's solutions.

A node network device as presently described is configured to show: 1) a solution document displaying a negative node object; 2) a number and descriptions of the negative node object's solved problems; 3) a number and descriptions of the negative node object's symptoms, issues, sub-problems, negative consequences, obstacles, risks and repercussions; 4) a number and descriptions of the negative node object's fulfilled terminal goals; and 5) a number and descriptions of the negative node object's alternative solutions.

In a preferred embodiment, a node network device is configured to allow users to create new objects and new connections. In particular, a node network device is configured to allow users to create: 1) new directional node objects; 2) new negative node objects; 3) new positive node objects; 4) new connection objects with parent connections, child connections; 5) connections between directional nodes and negative nodes; and 6) connections between directional nodes and positive nodes.

In yet another embodiment, a node network device is configured to allow users to create new connection objects from existing node objects by: 1) selecting a first existing node object from a list view; 2) selecting a second existing node object from a list view; and 3) creating the desired category of connection between the first and existing nodes.

A node network device as presently described is configured to allow users to create new connection objects from existing node objects by: 1) selecting two existing, separate nodes to create a parent connection between the existing, separate nodes; 2) selecting two existing, separate nodes to create a child connection between the existing, separate nodes; or 3) selecting two existing, separate nodes to create a directional connection between the separate nodes.

In a preferred embodiment, a node network device is configured to allow users to edit or delete node objects and connections.

A node network device as presently described is configured to allow users to edit or delete node objects by: 1) retrieving directional node objects, negative node objects, or positive node objects from a node objects database; 2) deleting the retrieved directional node objects, negative node objects, or positive node objects; or 3) modifying properties of the directional node objects, negative node objects, or positive node objects with updated information; and 3) submitting the note with updated information back to database.

In a preferred embodiment, a node network device as presently described is configured to allow a user to create one or more new node object connections by editing or deleting one or more existing connections between one or more node objects through: 1) deleting an existing node object; or 2) retrieving an existing node object and moving it to another location to create one or more new connections between the existing node object and one or more existing, separate node objects.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 2 shows a n-dimensional node network with n*n connection categories.

FIG. 3 shows an example of terminology for node classification and connection categorization.

FIG. 4 shows an example of node classification with specific terms.

FIG. 5 shows an example of node connections categorized as parent/child connections.

FIG. 6 shows an example of node connections categorized with specific terms.

FIG. 7 shows an example of a node object architecture.

FIG. 17 shows an example of views for creating new nodes and new connections.

FIG. 18 shows an example of views for creating new connections from existing nodes.

FIG. 19 shows an example of creating new connections from existing nodes.

FIG. 20 shows an example of views for editing or deleting nodes.

FIG. 21 shows an example of views for editing or deleting nodes.

FIG. 22 shows an example of views for editing or deleting connections.

DETAILED DESCRIPTION

Figure 1:
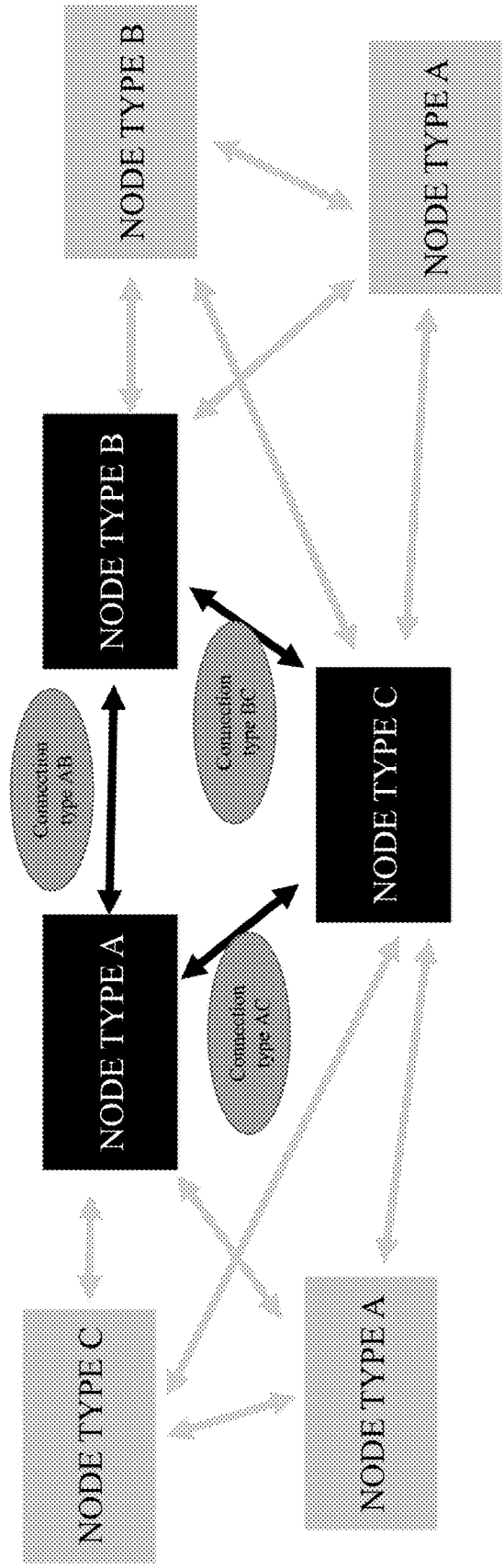
FIG. 1 shows a node network with classified nodes and categorized connections.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The present description includes one or more embodiments for crowdsourced problem-solution directories. As detailed herein, crowdsourced problem-solution directories provide two general functions: 1) a search function that assists users towards quickly finding solutions to problems; and 2) a problem-solving function, in which the directories facilitate communication and understanding around undiscovered and unsolved issues to simplify problem and goal identification, and to create effective solutions. The crowdsoured directories are technically implemented by use of a computer implemented node-based system to inventory problems, needs, and solutions. The disclosed computer implemented device is unique when compared with other known devices and solutions because it provides a method of organizing information as connected nodes so a user can see problems and solutions and make connections between previous solutions to problems and current unsolved problems or find improved solutions to problems.

In particular, the disclosed device is unique in that it is different from other known devices or solutions due to the presence of: (1) nodal organization of problems, solutions, subproblems, and terminal goals; and (2) the ability to navigate through problems, solutions, subproblems, and terminal goals via nodal connections between the problems, solutions, subproblems, and terminal goals.

Problems are a complex phenomenon that can take up valuable time, create conflict, and can hinder efficiency in an individual or an organization. The presently described approach to addressing problems posits that essentially all problems follow a pattern that can be translated to a framework that can be narrated by a readily learned user interface. Individuals and teams can use their cognition and reasoning to identify and describe solutions by using a tree-like graphic organizer that rests on a foundation of crowdsourced data to help guide the user from problem to solution. This crowdsourced network has the potential to provide ample opportunity for research and development, as well as facilitate learning and decision making.

The presently described crowdsourced network provides users tools by which users can post problems and connect them to solutions in various problem-solving spheres (which can be represented by form fields or content fields) to allow users to discuss, problems, solutions, and their connections.

A crowdsourced node network creates a universal problem-solution directory to qualify and inventory problems and their causes, and thereby provides a platform specific for solving complex problems. Nodes within this digital tree-like graphic organizer can be algorithmically ranked based on quantitative criteria, and machine learning systems can be developed to aid with further research, development, and problem-solving.

A node network comprises different nodes, whereby each single node is connected to one or more nodes. At a first level, three distinct types of nodes can be classified or labeled as such. For example, nodes can be classified as node type A, node type B, and node type C. Once nodes are classified as such, there are connections between the nodes whereby the connections themselves can be categorized or labeled as such (see FIG. 1). Accordingly, in this instance, the connections can be labeled as connection type AA; connection type AB; connection type AC; connection type BA; connection type BB; connection type BC; connection type CA; connection type CB; and connection type CC; for a total of nine connection types between the three types of nodes. Using this architectural framework as a starting point, additional types of nodes (node type N, where N can be any integer) can be added and classified or labeled, to form a n-dimensional node network with n*n connection categories (see FIG. 2).

In a preferred embodiment of the present node network, there are three distinct types of node entries that lay the foundation for the framework's language and architecture. These nodes can be referred to or classified as: 1) a directional node; 2) a positive node; and 3) a negative node. These classified nodes in turn can be connected by two general types of connection: 1) a positive connection between a positive node and a directional node; and 2) a negative connection between a negative node and a directional node (see FIG. 3).

Moving to a preferred embodiment of a more specific type of node network for problem solving, specific terminology can be applied to node types towards a node network for mapping problems, goals, and solutions. A first type of node as described herein is a directional node, which can also be referred to as a terminal goal. Terminal goals as used herein describe desired end states, which are usually descriptions of intangible concepts. Terms that may be used interchangeably or as a synonym for terminal goals include, but are not limited to, needs and values, wants, desires, values, expectations, interests, and requirements. In a preferred embodiment, terminal goals are referred to as needs and values (see FIG. 4).

A second type of node as described herein is a positive node, which can also be referred to as an instrumental goal. Instrumental goals are tangible methods and implementations to fulfill terminal goals. Terms that may be used interchangeably or as a synonym for instrumental goals include, but are not limited to, solutions, systems, methods, tools, laws, techniques, ideas, and inventions. In a preferred embodiment, instrumental goals are referred to as solutions (see FIG. 4).

A third type of node as described herein is a negative node, which can also be referred to as violations to terminal goals (or violated terminal goals). Terms that may be used interchangeably or as a synonym for violated terminal goals include, but are not limited to, problems, dilemmas, conflicts, difficulties, challenges, obstacles, repercussions, negative consequences, symptoms, sub-problems, risks, and issues. In a preferred embodiment, violated terminal goals are referred to as problems (see FIG. 4).

In a preferred embodiment, connections between nodes in a node network can be categorized as parent/child connections, in which a first node referred to as a parent node is connected to a second node referred to a child node. A parent child connection is formed in a directional sense, in which a parent node gives rise to a child node. Accordingly, a parent node can only give rise to a child node. Note that once a child node is formed, it in turn can become a parent node to a subsequent child node, and so forth. Furthermore, one or more parent nodes can connect to a same node by a parent type of connection, and that same node can connect to one or more child nodes by a child type connection.

Accordingly, node connections can be categorized as parent/child connections, in which positive and negative nodes can be connected to other positive and negative nodes with parent/child connections (see FIG. 5). Such parent/child connections can be summarized as eight different types of parent/child connections: 1) a positive parent of a negative node; 2) a positive parent of a positive node; 3) a negative parent of a negative node; 4) a negative parent of a positive node; 5) a positive child of a negative node; 6) a positive child of a positive node; 7) a negative child of a negative node; and 8) a negative child of a positive node (see FIG. 5).

Applying specific terminology in a preferred embodiment of a node network, the eight different types of parent/child connections give rise to six different connection categories: 1) a positive parent node or negative parent node connecting to a negative node, which is categorized as a historic originating root cause(s) or super problem(s); 2) a negative parent node connecting to a positive node, which is categorized as a solved problem(s); 3) a positive child node connecting to a negative node, which is categorized as a solution(s), system(s), method(s), or action step(s); 4) a negative child node connecting to a negative node or a positive node, which is categorized as a sub-problem(s), issues, negative consequence(s), risk(s), repercussion(s), obstacle(s), or a symptom(s); 5) a directional node connecting to a negative node, which is categorized as a violated terminal goal; and 6) a directional node connecting to a positive node, which is categorized as a fulfilled terminal goal (see FIG. 6). In this context, a parent/child node network is implemented towards providing solutions and fulfilling terminal goals. As the node network is implemented, root causes will become evident, and specific domains can be identified. The node network provides for addressing problems as having both symptoms and causes, thereby mapping cause and effect with a focus on problems, goals, and solutions.

In a preferred embodiment, the general node network concepts described above are implemented through a computer-based approach or system. As such, the concepts can be captured in a computer-based database structure and node objects.

At a first level, a node object in a computing system can comprise a positive or negative node; a reference field to directional nodes, whereby a database contains all directional nodes; a reference field to parent nodes, whereby a database contains all node objects; a text field with description, and other fields, such as tags, labels, comments, upvotes, and so forth (see FIG. 7). As shown in FIG. 7, a node object can refer to a directional node (or terminal goal) from a database of directional nodes (or terminal goals). Likewise, a node object can refer to another node object (which typically represents a positive or negative node) from a database of node objects (whereby the node objects represent positive or negative nodes).

Figure 8:
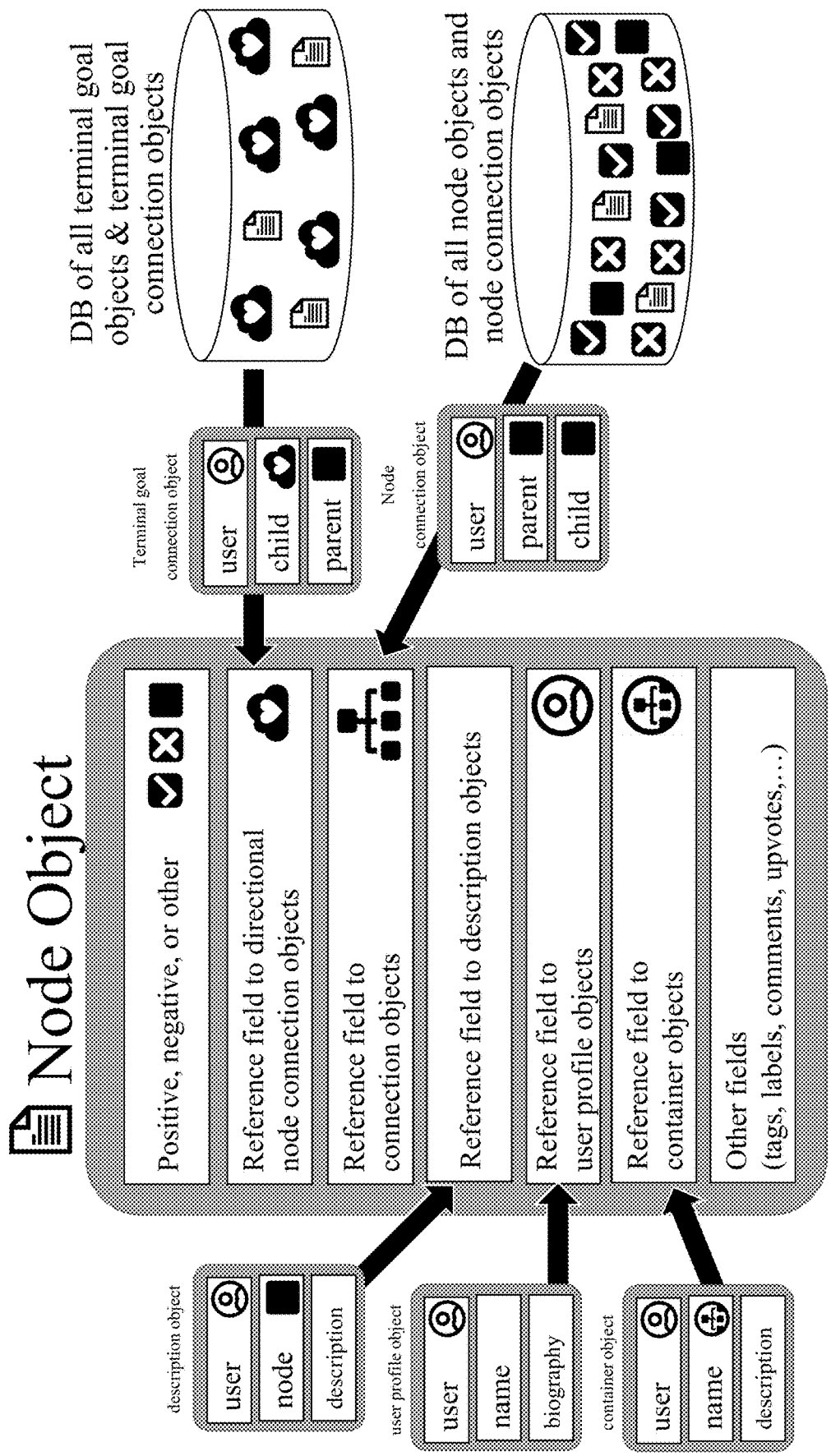
FIG. 8 shows an example of a node object architecture.

In practice, a preferred embodiment of a node object can be implemented in a computing system as follows. A node object can be a positive, negative, or other node; and the node object contains: 1) a reference field to directional node connection objects; 2) a reference field to connection objects; 3) a reference field to description objects; 4) a reference field to user profile objects; 5) a reference field to container objects; and 6) other fields, such as tags, labels, comments, upvotes, and so on. The reference field to directional node connection objects contains a terminal goal connection object that is specified by a user as a parent or child node type from a database of all terminal goal objects and terminal goal connection objects. The reference field to connection objects contains a node connection object that is specified by a user as a parent or child node type from a database of all node objects and node connection objects. The reference field to description objects contains a description specified by a user as a node with a description. The reference field to user profile objects contains a user profile object specified by a user with a name and a biography. The reference field to container objects contains a container object specified by a user with a name and a description. See FIG. 8.

Figure 9:
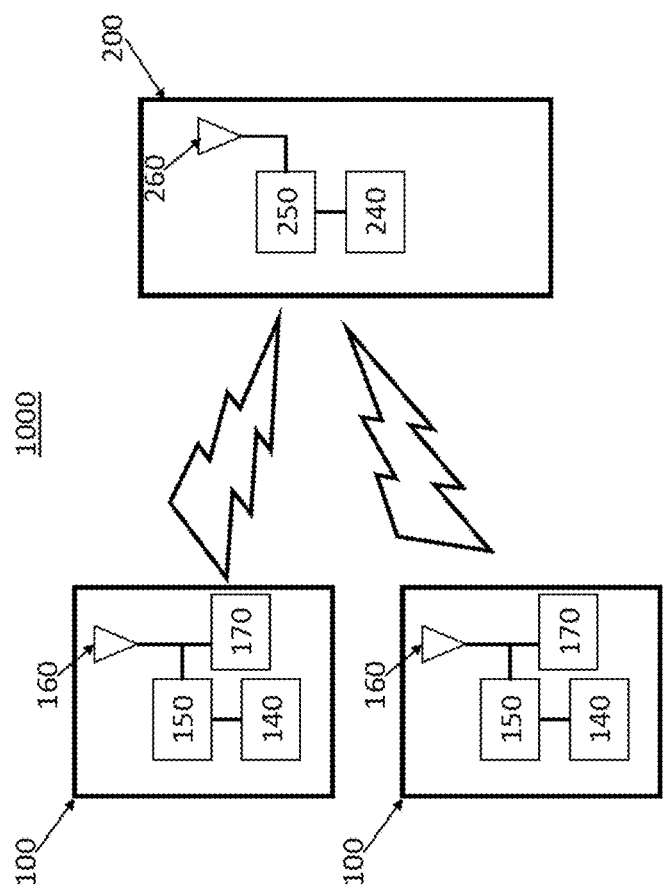
FIG. 9 shows an example schematic view of a network.

Turning now to FIG. 9, an example schematic view of a network 1000 is shown. The network 1000 may include at least one first electronic device 100 and at least one second electronic device 200. The network 1000 may include various other electronic devices that convey information in the network 1000, for example from the first electronic device 100 to the second electronic device 200. The first electronic device 100 may be a personal electronic device such as a personal computer, cell phone, etc. The first electronic device may include a memory 140, a processor 150, and a transceiver 160. The memory 140 may include volatile and non-volatile memory. The memory 140 may contain therein instruction for operating the first electronic device and other stored information. The memory 140 may be a non-transitory readable medium holding instructions thereon for implementing the features described below as part of an application, program, or other implementation of electronic instructions using electronic devices. The processor 150 may include one or more processing devices such as a central processing unit, controller, or other similar hardware. The processor 150 may be configured to execute the instructions stored in the memory 140 and control the first electronic device 100. The transceiver 160 may include one or more communication interfaces for wireless communications, wired communications, fiber optic communications, etc. The transceiver 160 may operate based on commands received from the processor 150 and be configured to communicate electronically with other electronic devices in the network 1000. The first electronic device 100 may also include a display 170. The display 170 may be configured to display images and information for a user based on commands received from the processor 150. The display 170 may be a touch screen capable of receiving input from a user.

The second electronic device 200 may include one or more computers, servers, or other similar devices. The second electronic device may include a memory 240, a processor 250, and a transceiver 260. The memory 240 may include volatile and non-volatile memory. The memory 240 may contain therein instructions for operating the second electronic device, operating a software platform, and other stored information. The memory 240 may be a non-transitory readable medium holding instructions thereon for implementing the features described below as part of an application, program, or other implementation of electronic instructions using electronic devices. The processor 250 may include one or more processing devices such as a central processing unit, controller, or other similar hardware. The processor 250 may be configured to execute the instructions stored in the memory 240 and control the second electronic device 200. The transceiver 260 may include one or more communication interfaces for wireless communications, wired communications, fiber optic communications, etc. The transceiver 260 may operate based on commands received from the processor 250 and be configured to communicate electronically with other electronic devices in the network 1000.

In a preferred embodiment, a first electronic device 100 is configured to display node objects and their connections on its display 170, such as a desktop computer screen, laptop computer screen, cell phone screen, etc. The device 100 in particular will be an input device configured to display node objects and their connections on its display 170 such that users are able to view, read, and browse the content displayed on the device 100.

Figure 10:
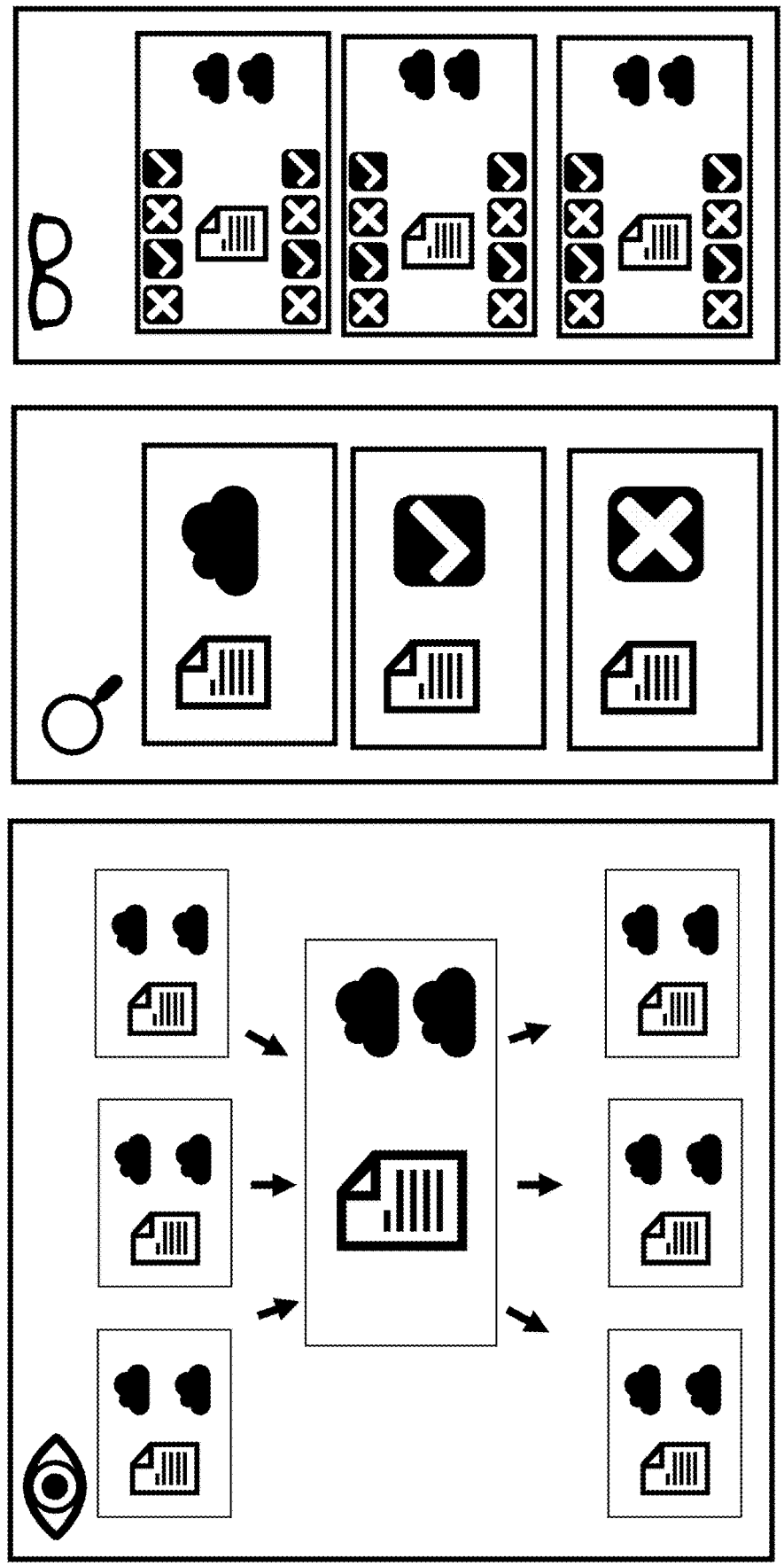
FIG. 10 shows an example of list views of node documents.

In another preferred embodiment, a first electronic device 100 is configured to display: 1) a node object of a first type of node; 2) nodes connected to that first type of node, wherein the different classifications of nodes and categories of connections are shown (such as in a displayed list view); and 3) the device is configured to provide the ability to select one particular node and receive detailed information about the node in the form of a node document (see FIG. 10). FIG. 10 shows three non-limiting examples of nodes and their connections displayed in a list view. In a first example, the list view shown with the eye symbol demonstrates a list view of parent nodes connected to a central node via parent type connections, and that central node in turn connected to child nodes via child type connections. In this architecture, a user can read about the central node object and connected directional nodes, and correspondingly navigate to read about parent node objects and their directional nodes, as well as child node objects and their directional nodes. In a second example, the list view shown with the magnifying glass symbol shows a list view of a node object displaying the contents of a directional node, a positive node, and a negative node, each of which can be further examined for their content (by selecting a given node, such as selecting a node with the magnifying glass). In a third example, the list view shown with the eyeglasses symbol shows an alternative list view of node objects and their connecting positive nodes, negative nodes, and directional nodes, whereby each of the connecting nodes can be further examined for their content (by selecting a given node, such as selecting a node with the eyeglasses).

Figure 11:
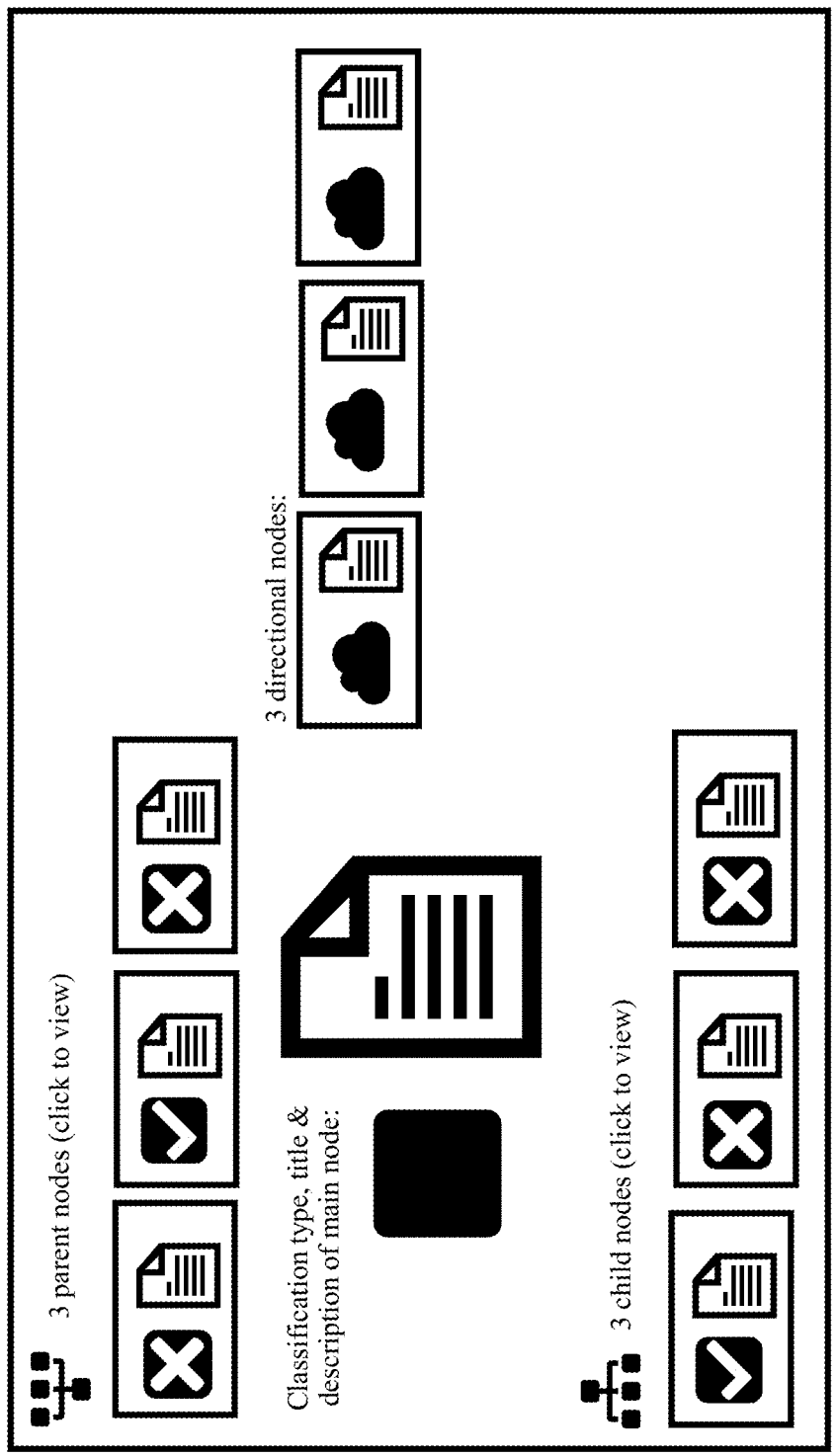
FIG. 11 shows an example of a nested node document.
Figure 12:
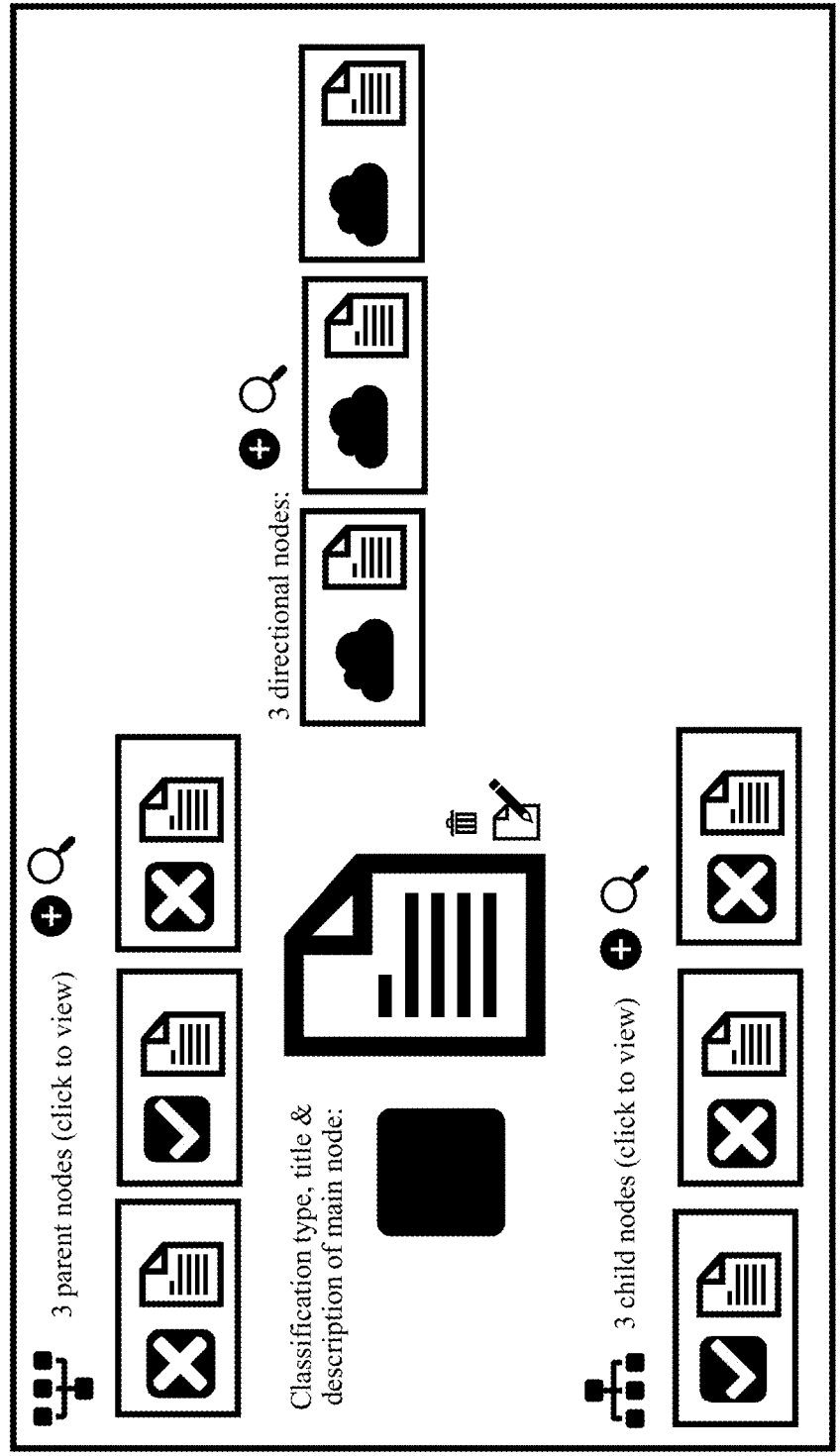
FIG. 12 shows an example of nested node document.

In yet another preferred embodiment, a first electronic device 100 is configured to show a nested node document that displays: 1) a main (or viewed) node object along with its classification of type of node, title, and a description; 2) a number and descriptions of the main node's directional nodes; 3) a number and descriptions of the main node's parent nodes and an indicator of a classification of these parent nodes; and 4) a number and descriptions of the main node's child nodes and an indicator of a classification of these child nodes (see FIG. 11). The example shown in FIG. 11 demonstrates a nested node document that contains 3 parent nodes: 1) a violated terminal goal, 2) a fulfilled terminal goal, and 3) another violated terminal goal; 3 directional nodes; and 3 child nodes: 1) a fulfilled terminal goal; 2) a violated terminal goal; and 3) another violated terminal goal. Each of nodes shown can be selected and viewed in greater detail. Additional functionality within the nested node document is shown in FIG. 12, which includes the ability to look at a list of nodes within a node (represented by the magnifying glass icon); add a node and create a connection (represented by the + icon); edit a node or its connection (represented by the pencil/paper icon); and delete a node and its connection (represented by the trash can icon). Accordingly, this nested node document provides a user with the ability to see other node documents within the nested node document; that is, it provides the ability to navigate between node levels. The nested node document also provides views into the connections between nodes, as well as the ability for a user to create a new connection and edit it. Accordingly, the nested node document provides for basic computer CRUD functionalities (create; read; update; delete) and provides for CRUD networks between nodes.

Figure 13:
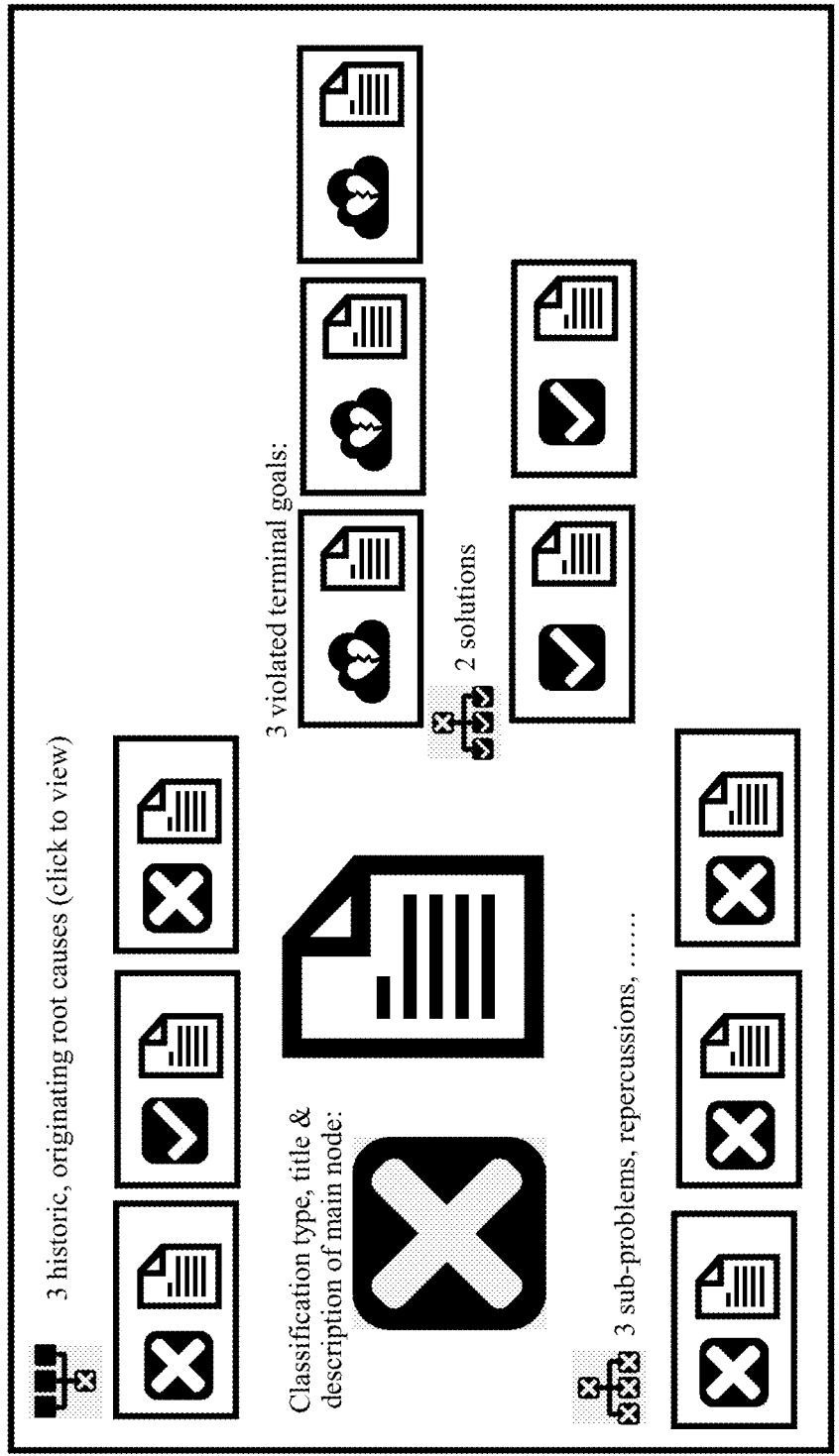
FIG. 13 shows an example of a problem document.
Figure 14:
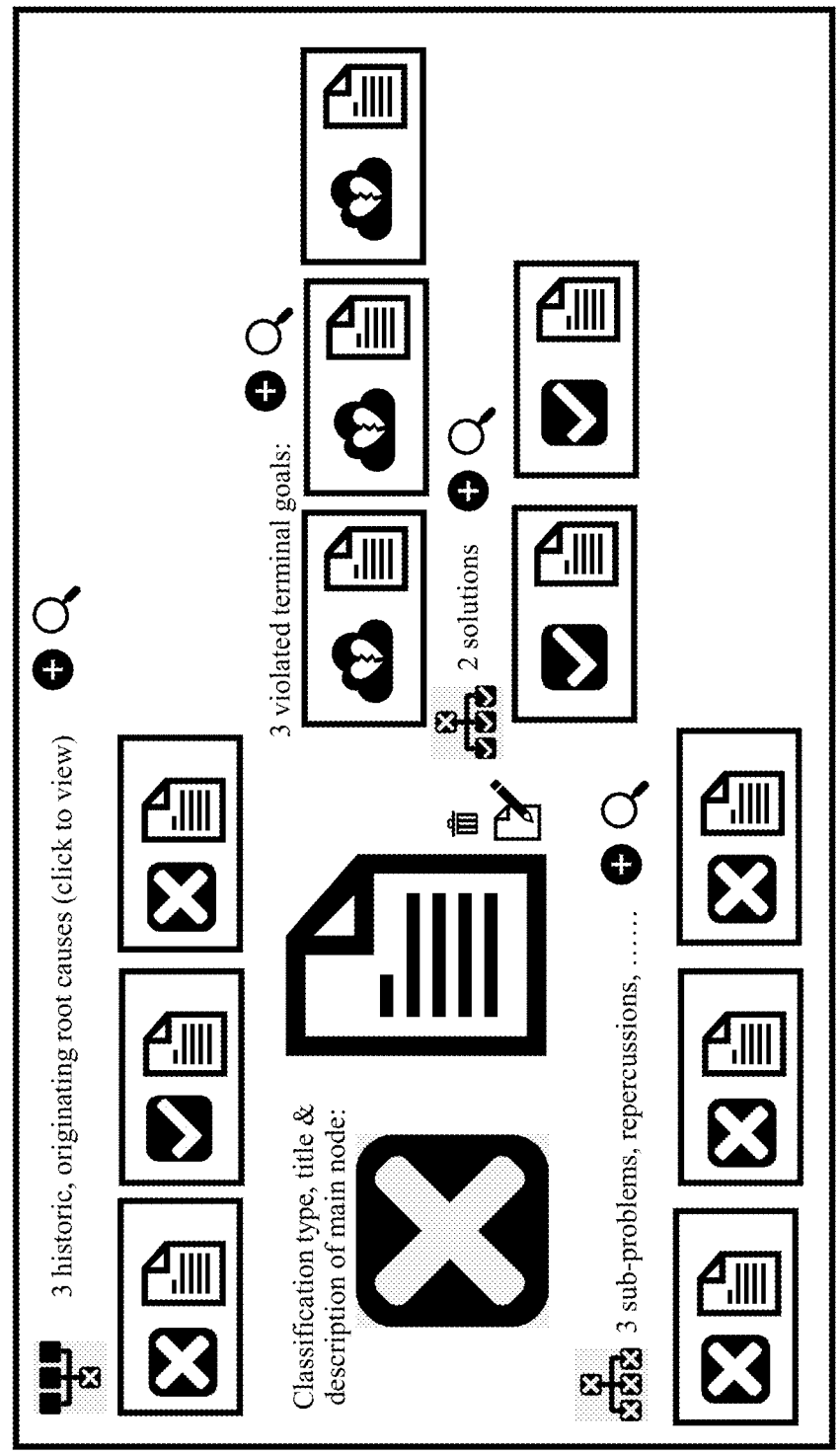
FIG. 14 shows an example of a problem document.

A preferred embodiment of a node network as described herein further provides a problem document, as shown in the example of FIG. 13. In this example; a user is provided with nodes for: 1) 3 historic, originating root causes; 2) 3 violated terminal goals; 3) 2 solutions; 4) 3 sub-problems, repercussions, and so on; and 4) a classification type, title, and description of the main node being displayed. Additional functionality within the nested node document is shown in FIG. 14, which includes the ability to look at a list of nodes within a node (represented by the magnifying glass icon); add a node and create a connection (represented by the + icon); edit a node or its connection (represented by the pencil/paper icon); and delete a node and its connection (represented by the trash can icon). Accordingly, this exemplary problem document enables a user to navigate between node levels; examine connections between nodes; create a new connection; and edit a connection. As such, the problem document provides for basic computer CRUD functionalities (create; read; update; delete) and provides for CRUD networks between nodes.

Figure 15:
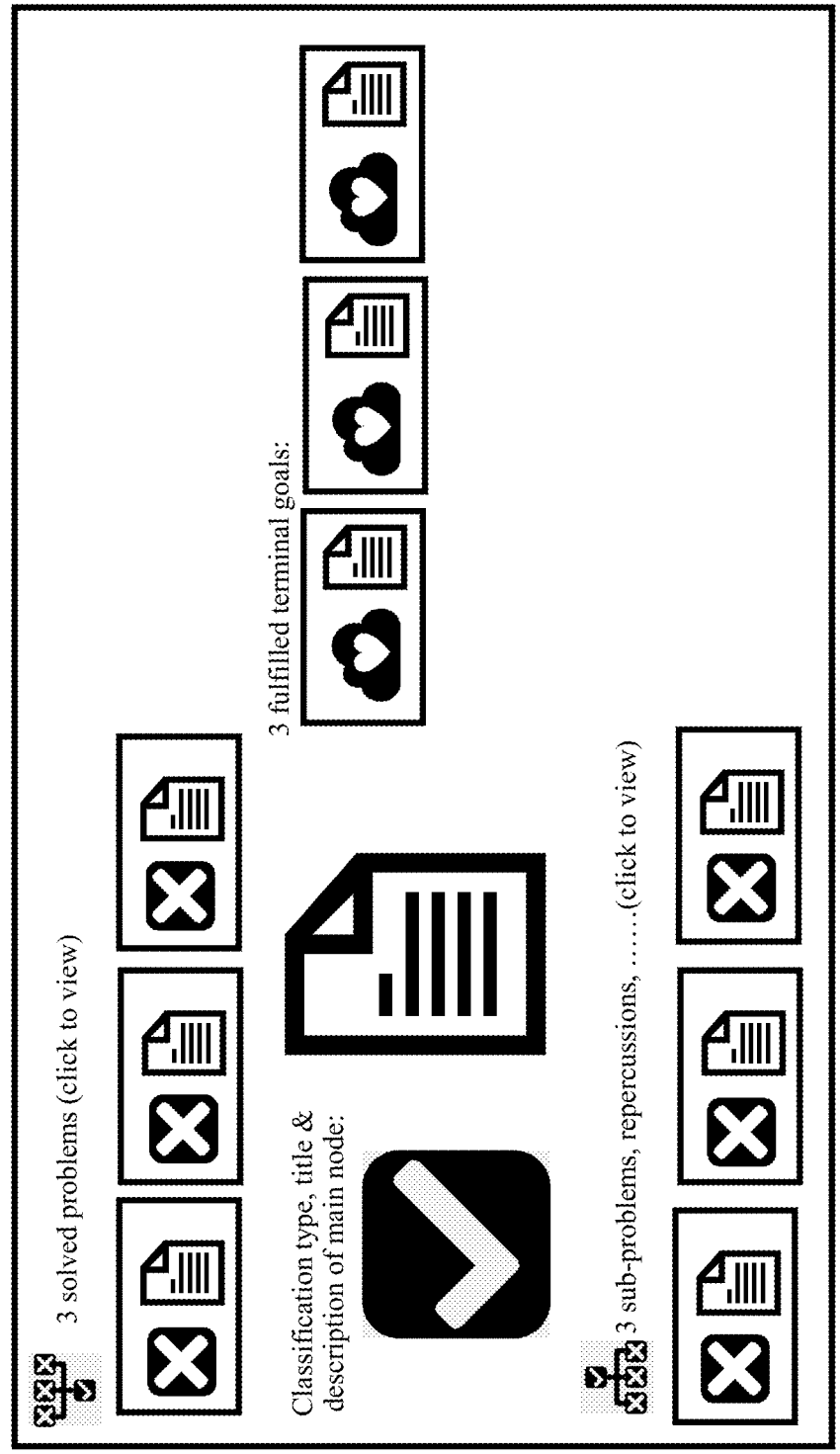
FIG. 15 shows an example of a solution document.
Figure 16:
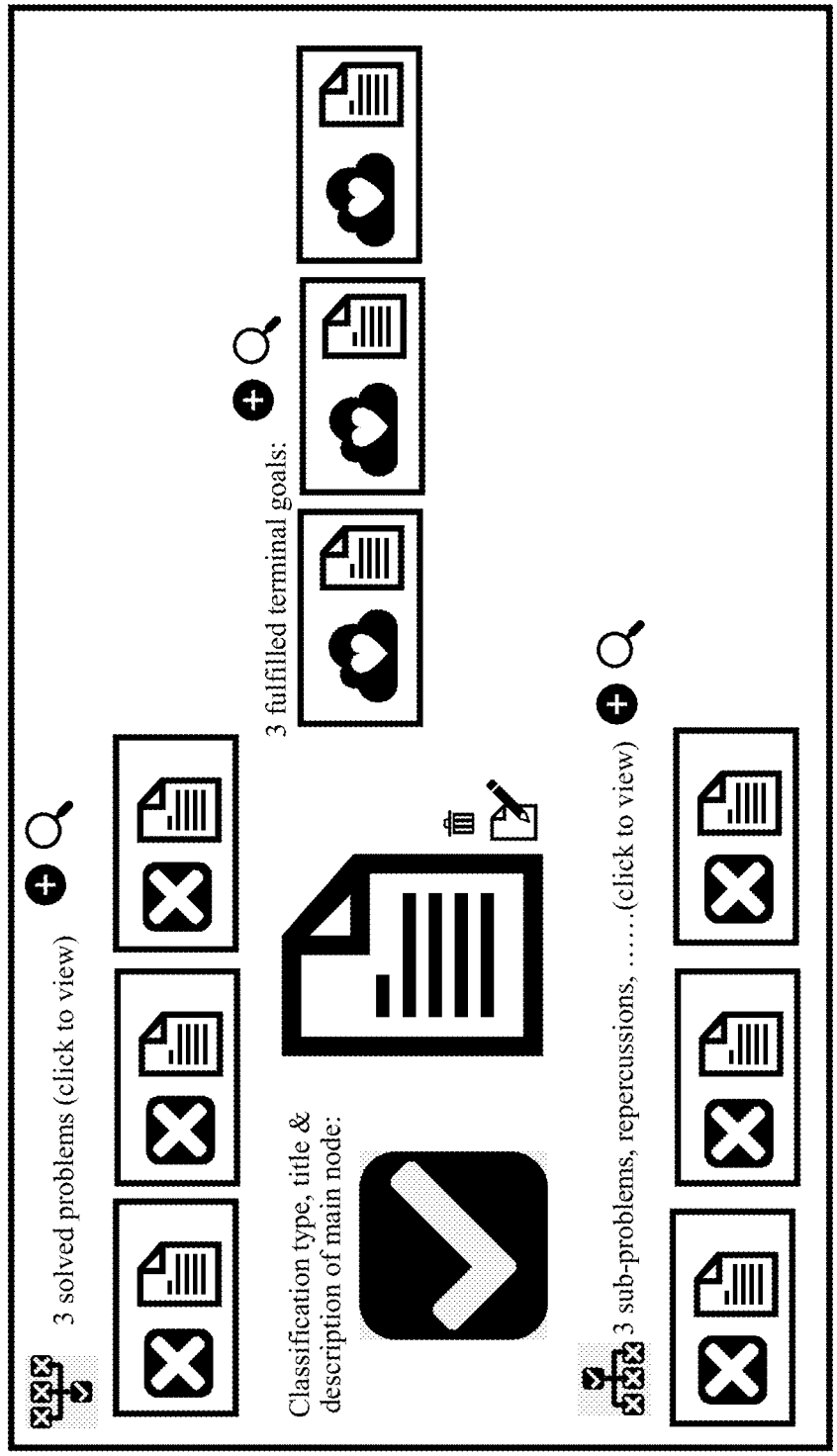
FIG. 16 shows an example of a solution document.

A preferred embodiment of a node network as described herein further provides a solution document, as shown in the example of FIG. 15. In this example; a user is provided with nodes for: 1) 3 solved problems; 2) 3 fulfilled terminal goals; 3) 3 sub-problems, repercussions, and so on; and 4) a classification type, title, and description of the main node being displayed. Additional functionality within the nested node document is shown in FIG. 16, which includes the ability to look at a node within a node (represented by the magnifying glass icon); add a node (represented by the + icon); edit a node (represented by the pencil/paper icon); and delete a node (represented by the trash can icon). Accordingly, this exemplary solution document enables a user to navigate between node levels; examine connections between nodes; create a new connection; and edit a connection. As such, the solution document provides for basic computer CRUD functionalities (create; read; update; delete) and provides for CRUD networks between nodes.

In another preferred embodiment, a first electronic device 100 is configured is to provide a user the capability to create new nodes and connections in a node network. In this regard, the device 100 is providing the ability to create a new node, as opposed to more basically just displaying a node(s) and the ability to navigate between nodes and their connections. As indicated above, in the examples shown for nested node, problem, and solution documents (see FIGS. 12, 14, and 16), a user has the option of adding a new node and/or a new node connection via an input mechanism, such as the displayed + icon shown in FIGS. 12, 14, and 16. Accordingly, the node network provides a user the functionality of adding a new node and/or new node connection.

More specifically, a first electronic device 100 is configured to provide users the ability to create: 1) new directional node objects; 2) new negative node objects; 3) new positive node objects; 4) new connection types with parent connections and child connections; 5) connections between directional nodes and negative nodes; and 6) connections between directional nodes and positive nodes (see FIG. 17).

In another preferred embodiment, a first electronic device 100 is configured to allow users to create new connections from existing node objects by: 1) selecting a first existing node object from a displayed list or similar view; 2) selecting a second existing node object displayed from a list or similar view; and 3) creating the desired category of node connection (see FIG. 18). The electronic device 100 is further configured to provide users with the capability to examine existing nodes and their existing connections to nodes, such as a directional node, a positive node, and a negative node, each of which can be further examined for their content (for example, by selecting a given node, such as selecting a node with the magnifying glass).

In yet another preferred embodiment, a first electronic device 100 is configured to allow users to create new connection objects from existing node objects more specifically by: 1) selecting nodes to create a parent connection object between the existing nodes, whereby the nodes are selected from a displayed list view (or similar view); 2) selecting nodes to create a child connection object between the existing nodes, whereby the nodes are selected from a displayed list view (or similar view); 3) selecting nodes to create a directional connection object between the existing nodes, whereby the nodes are selected from a displayed list view (or similar view) (see FIG. 19). The electronic device 100 is further configured to provide users with the capability to examine existing nodes and their existing connections to nodes, such as a directional node, a positive node, and a negative node, each of which can be further examined for their content (for example, by selecting a given node, such as selecting a node with the magnifying glass).

In another preferred embodiment, a first electronic device 100 is configured to allow users to edit or delete nodes from an existing node network. In this manner, a user may: 1) delete a node; or 2) edit a node by making desired changes to a node and then saving the changes to the node network (see FIG. 20).

More specifically, a first electronic device 100 is configured to provide users the ability to edit or delete nodes by: 1) selecting a node to delete, whereby the node is classified by its type, title, and description, such as parent node, directional node, or child node; and 2) editing or deleting the selected node object (see FIG. 21). In the example shown in FIG. 21, a main node to be edited or deleted is displayed in the context of nested nodes, which in this example includes providing a user with nodes for: 1) 3 parent nodes; 2) 3 directional nodes; and 3) 3 child nodes. Additional functionality within the nested node document is shown in FIG. 20, which includes the ability to look at a node within a node (represented by the magnifying glass icon); add a node (represented by the + icon); edit a node (represented by the pencil/paper icon); and delete a node (represented by the trash can icon).

In another preferred embodiment, a first electronic device 100 is configured to allow users to edit or delete connections from an existing node network. In this manner, a user may: 1) select a node and move it to another location to change its connection; or 2) delete a connection by deleting a node from the node network (see FIG. 22). In the example shown in FIG. 22, a user is provided with displayed nodes for: 1) 3 parent nodes; 2) 3 directional nodes; and 3) 3 child nodes. A given node can be moved to another area within the displayed nodes to change its connection; for example, a parent node can be moved so as to change its connection from that as a parent node to that of a child node. Additional functionality within the nested node document is shown in FIG. 20, which includes the ability to look at a node within a node (represented by the magnifying glass icon); add a node (represented by the + icon); edit a node (represented by the pencil/paper icon); and delete a node (represented by the trash can icon).

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The exemplary, preferred embodiment was chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A computer implemented problem-solution directory system for solving problems and achieving goals, the computer implemented problem-solution directory system comprising:
    a multi-dimensional node network to categorize and qualify cause-and-effect relationships between problems, goals, and solutions via well-defined node connections for problem solving, the multi-dimensional node network comprising three or more different types of nodes that are interconnected;
    wherein each type of node is interconnected to one or more types of nodes, such that a given type of node can be connected to a similar type of node and/or a different type of node; wherein nodes are connected by connections that are categorized as either a connection between similar types of nodes or a connection between different types of nodes;
    wherein the node network comprises node connections categorized as parent connections, child connections, or directional connections;
    wherein the computer implemented problem-solution directory system further comprises: a node object, the node object comprising:
    an indicator to classify the node as positive or negative;
    a reference field to one or more directional node connection objects that contain a terminal goal connection object from a database of terminal goal objects and terminal goal connection objects;
    a reference field to one or more connection objects that contain a connection object specified by a user as a parent or child type node from a database of positive or negative node objects and node connection objects;
    a reference field to one or more description objects that contain a node description specified by a user;
    a reference field to one or more container objects, the container objects comprising tags, labels, or folders that contain a name and descliption of the container specified by a user;
    a reference field to one or more user profile objects that contain a user profile object specified by a user with a name and a biography; and
    other fields for labeling, categorizing, describing, or interacting with the node object.

2. A computer implemented problem-solution directory system for solving problems and achieving goals, the computer implemented problem-solution directory system comprising:
    a multi-dimensional node network to categorize and qualify cause-and-effect relationships between problems, goals, and solutions via well-defined node connections for problem solving, the multi-dimensional node network comprising three or more different types of nodes that are interconnected;
    wherein each type of node is interconnected to one or more types of nodes, such that a given type of node can be connected to a similar type of node and/or a diff type of node;
    wherein nodes are connected by connections that are categorized as either a connection between similar types of nodes or a connection between different types of nodes;
    wherein the node network comprises node connections categorized as parent connections, child connections, or directional connections;
    wherein the computer implemented problem-solution directory system is implemented through a problem-solving device comprising:
    at least one memory including processor readable instructions;
    at least one display to display images and information for a user;
    at least one processor arranged to read the processor readable instructions stored on the at least one memory and execute the processor readable instructions to:
    receive a first request for first nodal information;
    send the first nodal information in response to the first request for the first nodal information;
    receive a second request for second nodal information;
    send the second nodal information in response to the second request for the second nodal information;
    wherein the first nodal information includes a first node and one or more first nodal connections, and the second nodal information includes a second node and one or more second nodal connections;
    wherein the device is configured to provide a user an ability to navigate through a multi-dimensional node network of three or more different types of nodes that are interconnected;
    wherein each type of node is interconnected to one or more types of nodes, wherein a given type of node can be connected to a similar type of node and/or a different type of node;
    wherein nodes are connected by connections that are categorized as either a connection between similar types of nodes or a connection between different types of nodes; and
    wherein the device is further configured to provide a user an ability to add new nodes and connections to the system, connect existing nodes, edit nodes and their connections, delete connections between nodes, and delete nodes and their connections.

3. The computer implemented problem-solution directory system of claim 2, wherein the problem-solving device is further configured to provide a user with an ability to select one particular node and receive detailed information for the node,
- wherein the device is configured to display a node of one type and other nodes connected to it in a manner that displays different classifications and descriptions of nodes and categories of connections.

4. The computer implemented problem-solution directory system of claim 2, wherein the problem-solving device is further configured to show a nested node document that displays:
- a node object;
- an indicator of a classification of the node object;
- a number and descriptions of the node object's directional nodes;
- a number and descriptions of the node object's parent nodes and an indicator of a classification of these parent nodes; and
- a number and descriptions of the node object's child nodes and an indicator of a classification of these child nodes;
- wherein the device is configured to provide a user with the ability to see other node documents within the nested node document and navigate between node levels.

5. The computer implemented problem-solution directory system of claim 2, wherein the problem-solving device is further configured to show a problem document that displays:
- a negative node object;
- a number and descriptions of the negative node object's historic, originating root cause nodes and an indicator of a classification of these nodes;
- a number and descriptions of the negative node object's symptoms, issues, sub-problems, negative consequences, and repercussions;
- a number and descriptions of the negative node object's violated terminal goals; and a number and descriptions of the negative node object's solutions.

6. The computer implemented problem-solution directory system of claim 2, wherein the problem-solving device is further configured to show a solution document that displays:
- a positive node object;
- a number and descriptions of the positive node object's solved problems;
- a number and descriptions of the positive node object's issues, sub-problems, negative consequences, obstacles, risks, and repercussions;
- a number and descriptions of the positive node object's fulfilled terminal goals; and
- a number and descriptions of the positive node object's alternative solutions.

7. The computer implemented problem-solution directory system of claim 2, wherein the problem-solving device is further configured to allow a user to create new node objects and new connections in a node network, wherein each new node object and new connection comprises:
- one or more directional node objects;
- one or more negative node objects;
- one or more positive node objects;
- one or more connections with parent connections;
- one or more connections with child connections;
- one or more connections between directional nodes and negative nodes;
- and one or more connections between directional nodes and positive nodes.

8. The computer implemented problem-solution directory system of claim 2, wherein the problem-solving device is further configured to allow a user to create one or more new connections from new or existing node objects by:
- selecting a first new or existing node object;
- selecting a second new or existing node object; and
- creating a desired category of connection between the selected nodes.

9. The computer implemented problem-solution directory system of claim 2, wherein the problem-solving device is further configured to allow a user to create a desired category of connection between first and second new or existing nodes, the desired category comprising:
- a parent connection between the first and second new or existing nodes; a child connection between the first and second new or existing nodes; or
- a directional connection between the first and second new or existing nodes.

10. The computer implemented problem-solution directory system of claim 2, wherein the problem-solving device is further configured to allow a user to edit a node object and its respective connections by:
- retrieving a directional node object, a negative node object, or a positive node object from a node objects database;
- modifying properties and connections of the retrieved directional node object, negative node object, or positive node object with updated information; and
- submitting the node object with updated information back to the database.

11. The computer implemented problem-solution directory system of claim 2, wherein the problem-solving device is further configured to allow a user to a delete node object and its respective connections by:
- retrieving a directional node object, a negative node object, or a positive node object from a node objects database; and
- deleting the retrieved directional node object, negative node object, or positive node object and the node object's respective connections to other nodes from the database.

12. The computer implemented problem-solution directory system of claim 2, wherein the problem-solving device is further configured to allow a user to edit or delete one or more existing connections between one or more node objects by:
- retrieving a first node object and second node object that share a connection from the node objects database;
- modifying properties of the retrieved node objects with updated information to remove their connection;
- submitting the node objects with updated information back to the database:
- and editing or deleting a related node connection object from the database to update the multi-dimensional node network.

13. The computer implemented problem-solution directory system of claim 2, wherein the problem-solving device is further configured to allow a user to create one or more new node object connections by editing one or more existing connections between one or more node objects through:
- selecting an existing node object and moving it to another location within the display of nodes, to create one or more new connections between the existing node object and one or more existing, separate node objects, while automatically making required modifications in the database to update the multi-dimensional node network.

* * * * *